March 1, 1932.   R. O. HELGEBY   1,848,062
ODOMETER
Filed Nov. 23, 1928
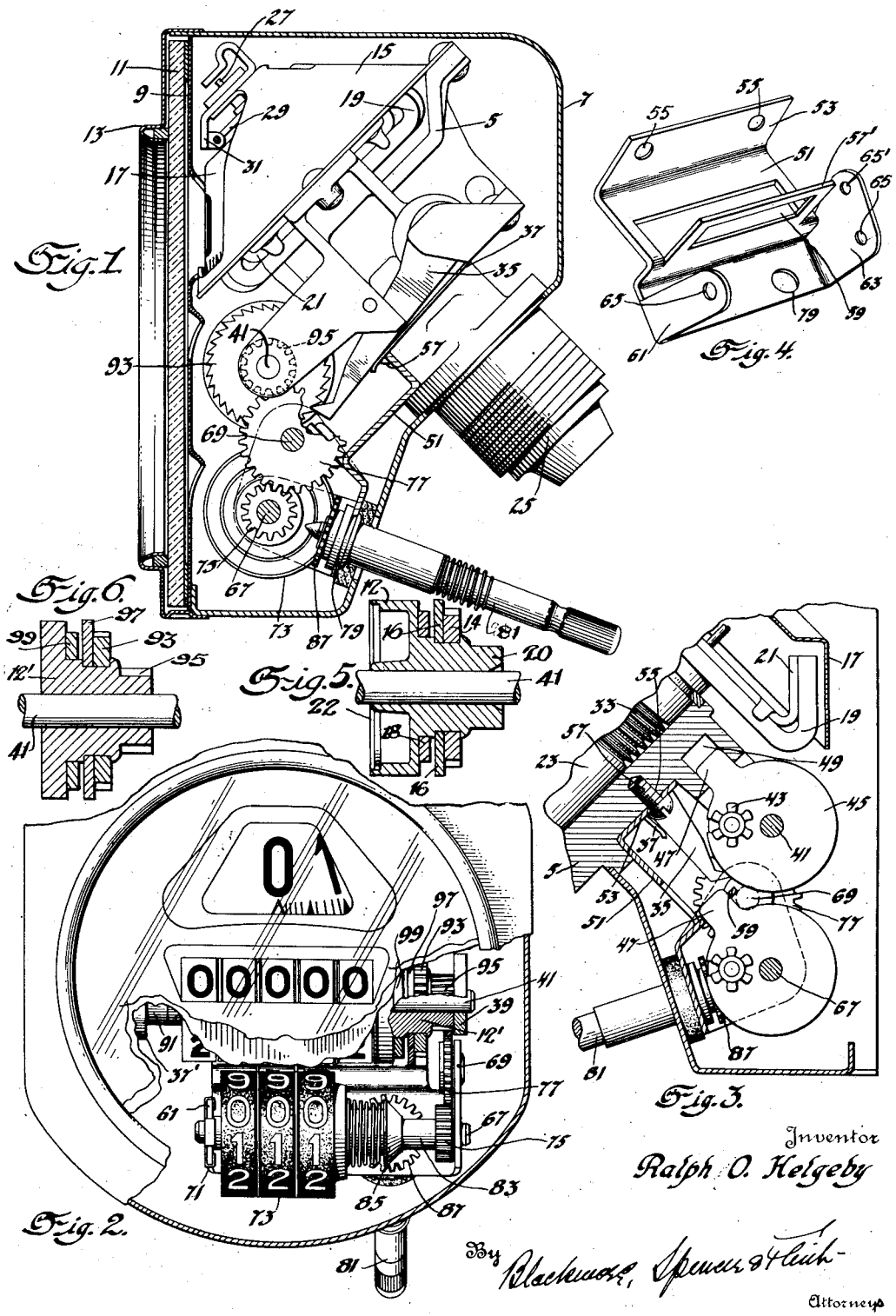
Inventor
Ralph O. Helgeby
By Blackmore, Spencer & Leitch
Attorneys Patented Mar. 1, 1932

1,848,062

UNITED STATES PATENT OFFICE

RALPH O. HELGEBY, OF FLINT, MICHIGAN, ASSIGNOR TO A C SPARK PLUG COMPANY, OF FLINT, MICHIGAN, A CORPORATION OF MICHIGAN

ODOMETER

Application filed November 23, 1928. Serial No. 321,359.

This invention relates to measuring instruments, and particularly to the odometer part of a combined speedometer and odometer as used on vehicles.

An object of the invention is to provide an attachment whereby an odometer, having a single set of registering wheels, may be supplemented by a second set of wheels in driving relation to the first set; in other words, the object is to convert a "tripless" into a combined "season and trip" instrument.

As another and associated object, the invention aims to provide means for making the above conversion with but few changes in the original instrument.

Other objects and advantages will be understood from the following description.

In the drawings:

Figure 1 is a side elevation of a combined speedometer and odometer, the latter having my novel attachment added thereto. This figure shows the casing in vertical section.

Figure 2 is a view in front elevation, parts broken away and parts in section.

Figure 3 is a vertical sectional view through a portion of the instrument.

Figure 4 is a detail in perspective.

Figure 5 is a sectional view through the decimal wheel of the original instrument.

Figure 6 is a view, similar to Figure 5, of the dummy substituted for the elements shown in Figure 5.

Referring by reference characters to the drawings, numeral 5 designates a frame, preferably die cast, and numeral 7 is the enclosed casing for the frame. At the front of the instrument the casing is closed by dial plate 9, a glass 11 and a bezel 13 in much the usual way.

The frame 5 is surmounted by a field plate 15 of conical shape. Within the field plate is a conical speed cup 17 mounted for rotation, its rotation being influenced by a bar magnet 19. The magnet has its ends turned upwardly into the region enclosed by the speed cup and field plate, and into parallelism with the walls of the speed cup and field plate. The magnet may be provided with a temperature compensator designated by the numeral 21. This magnet rotates with, and is secured to, the upper end of the rotor or worm shaft 23, journaled in the frame 5. This rotor or worm shaft is to be driven by a conventional flexible cable (not shown), the connection with the cable being made at the stem part 25 of the frame. The speed cup is carried by a suitable spindle 27, the rotation of which is biased by a hair spring 29, which latter may be attached to a controlling member 31. The rotor, or first worm shaft 23, drives through a worm 33 a second worm shaft (not shown), the latter functioning to operate a reciprocating pawl 35 held in active position by a spring 37. The above structure, relating more particularly to the speedometer, is enumerated to make clear the nature of the instrument with which the improvement of this invention is concerned. It is not per se a part of this invention.

The frame 5 has a pair of spaced arms 37' and 39 supporting a shaft 41, upon which are rotatably supported a plurality of figure wheels, as is usual in odometers. This series of six wheels includes a decimal wheel 12 shown in Figure 5, but not in other figures, because shown replaced therein by a dummy wheel with associated parts. The rotation of the decimal wheel, or wheel of lowest denomination, is effected by a ratchet wheel 14 staked upon the hub of the wheel, and driven by the pawl 35 in a manner well understood. The decimal wheel may also have a spacing member 16 to guide the pawl, and there may be a brake element 18 engaging the hub of the decimal wheel to prevent undesired movements. The decimal wheel also has a hub extension 20 which is intended to be in engagement with the frame arm 39. As is usual in such instruments, the decimal wheel is provided with a transfer lug 22 which operates through the instrumentality of an intermediate driving pinion to at times rotate the next wheel of the series. A transfer mechanism between the successive wheels includes transfer pinions 43, rotatably mounted on carrier plates 45, supported on shaft 41, and held from rotation by extensions 47 received within a recess 49 provided therefor in the die cast frame. These pinions are at times rotated by the wheels at their right, and rotate the wheels at the left through instrumentality of the transfer lugs and gear teeth in a manner well understood in the art.

To provide for the convenient addition of a trip set of wheels to the tripless instrument, there is provided a stamped plate 51 having an angular portion 53 provided with openings 55 for fastening means 57. These fastening means serve to secure the plate 51 to the die cast frame 5. The plate 51 also has wings 61 and 63 apertured as at 65 to receive and support shaft 67, wing 63 being apertured as at 65' to receive and support 69. The shaft 67 may be held from axial movement by a suitable retainer after the manner common in odometer construction; on the drawings such a retainer is shown in a conventional manner and is indicated by numeral 71. Upon shaft 67 are figure wheels 73, the wheel at the right being a decimal wheel. The transfer mechanism between the wheels is the same as in the case of the instrument proper. A rectangular portion 57' is stamped out from plate 51 and formed with a rectangular opening 59 to receive the extensions 47 of the transfer pinion carriers of the trip set of wheels, as explained above.

On shaft 67 is a sleeve 83 carrying a gear element 75 which may be rotated by gear element 77 on stud 69. The stamped plate 51 has an opening 79 for a reset stem 81 arranged to actuate the sleeve 83 by means of a cam 85, to thereby release the inter-engagement of gears 75 and 77, and to permit resetting of the figure wheels of the trip set through the instrumentality of gear element 87 carried by the reset spindle.

As stated above, the tripless instrument makes use of six figure wheels, the wheel at the right hand being a decimal wheel. When the trip series of wheels, with its own decimal wheel, is added to the instrument, there is no need to retain the decimal wheel of the original set, and it is removed. In the original instrument the vertical center line divided the figure wheels symmetrically, there being three wheels on each side of this vertical line. To maintain symmetry when the instrument is changed by adding a trip set, the vertical center line should pass through the middle portion of the middle one of the five retained wheels. This is illustrated in Figure 2. To this end, after the decimal wheel has been removed, the series of five remaining wheels is moved to the right, and a spacer 91 is used between the hub of the left wheel of the series, and the arm 37'. In order to make possible the addition of the trip series of wheels to the tripless instrument, and to use the same die cast frame, the spacing between frame arms 37' and 39 is such as to require that there be a spacing element at the right of the hub of the decimal wheel of the original set, and between that wheel and arm 39. That spacing element may be separable or, as shown in the drawing, may be provided for by constructing the hub of decimal wheel 12 with an elongated extension 20.

It will be seen that when the decimal wheel is removed, and the plate 51 carrying the trip set of wheels added, a ratchet must be used to cooperate with pawl 35, and there must be a pinion to operate gear element 77. To accomplish this purpose, a dummy, or transfer wheel 12', is placed in substantially the position occupied by the decimal wheel 12. This dummy is like the decimal wheel in having transfer lugs for operating the transfer pinion through which the unit wheel is to be rotated. It is like the decimal wheel in having a ratchet wheel 93 corresponding to ratchet wheel 14 and staked upon its hub in a position to engage the pawl 35. Between the ratchet wheel 93 and the arm 39 the hub of the dummy is formed as a driving pinion 95, and engages element 77. This driving pinion 95 occupies the position of the hub 20 of the decimal wheel of the original series. Preferably, the hub of the dummy will be provided with a spacing washer 97 and with a brake element 99, these elements corresponding with the similar parts on the decimal wheel. It will be noted that, since the position of the ratchet is predetermined by the location of the pawl, the elongated hub of the decimal wheel may very conveniently be taken by the driving pinion 95 of the dummy, and the attachment 51 is arranged so that the gear element 77 will mesh with such location of the driving gear 95.

It should also be noted that in die casting the frame 5, the spacing of arms 37' and 39 is made such as to require the presence of the elongated hub 20, or its equivalent, to the end that, when the dummy is substituted for the decimal wheel, suitable provision may be made for a pinion like pinion 95 to drive the gear element 77. It should also be observed that the five figure wheels are moved to the right to an extent corresponding to one-half the axial length of a single figure wheel. The axial dimension of the dummy from the ratchet wheel to its left end will be substantially but one-half the axial length of a digit wheel shorter than the decimal wheel it replaces.

By the arrangements described the conversion is easily made. It requires no change in the die cast frame 5. A spacer is added to the left of the season set of wheels to effect a symmetrical location of the retained five wheels. A dummy is substituted for the decimal wheel, the dummy being of reduced axial dimension, but carrying the ratchet wheel in the same position relative to the pawl and having a driving pinion in place of the plain hub extension of the original decimal wheel. The stamped frame 51 may be readily attached by fastening means 57, and the instrument becomes a combined season and trip odometer.

A somewhat enlarged casing is required to house the converted instrument, and one having an opening for the reset stem associated with the trip set. Obviously a modified face plate must be used. These are, however, parts used only in the final assembly after the operating parts of the instrument have been assembled.

I claim:

1. In a method of assembling a combined season and trip odometer, the series of steps which comprises removing a wheel from one end of a set of figure wheels designed for a tripless odometer, substituting for said wheel a dummy having a driving member, adding a trip set of figure wheels provided with means for transmitting the drive from said driving member to said trip set of figure wheels, and placing said means in driving engagement with said driving member.

2. In a method of assembling a combined season and trip odometer, the series of steps which comprises removing a wheel from one end of a set of figure wheels designed for a tripless odometer and mounted on a frame, substituting for said wheel a dummy having a driving member, securing an auxiliary frame to said frame, mounting on said auxiliary frame a trip set of figure wheels, and operatively associating with said driving member and said trip set of figure wheels means for transmitting the drive from said driving member to said trip set of figure wheels.

3. In a method of assembling a combined season and trip odometer for a vehicle, the series of steps which comprises removing from a set of figure wheels designed for a tripless odometer that wheel provided with a gear adapted to be driven by the vehicle, substituting for said wheel a dummy having a gear corresponding to the gear of said wheel and having a driving pinion, adding a trip set of figure wheels provided with means for transmitting the drive from said pinion to said trip set of figure wheels, and placing said means in driving engagement with said pinion.

4. In a method of assembling a combined season and trip odometer, the series of steps which comprises removing a wheel from one end of a set of figure wheels designed for a tripless odometer, substituting for said wheel a dummy having less axial extent than said wheel and having a driving member, moving the remaining wheels toward said dummy, placing a spacer at the other end of said set of figure wheels, adding a trip set of figure wheels provided with means for transmitting the drive from said driving member to said trip set of figure wheels, and placing said means in driving engagement with said driving member.

5. A combined season and trip odometer comprising a main frame, a set of figure wheels mounted on said frame, a dummy at one end of said figure wheels, said dummy having a driving connection with said set of figure wheels at one end and having a driving pinion at the other end, an auxiliary frame secured to said main frame, a second set of figure wheels mounted on said auxiliary frame, and means for transmitting the drive from said driving pinion to said second set of figure wheels.

6. A combined season and trip odometer comprising a set of figure wheels, a dummy positioned at one end of said figure wheels and having a driving member and a dummy wheel portion, said dummy wheel portion being of less axial extent than a figure wheel, a spacer at the other end of said set of figure wheels, the axial extent of said spacer being substantially one half of that of a figure wheel, a second set of figure wheels, and means for transmitting the drive from said driving member to said second set of figure wheels.

7. A combined season and trip odometer comprising a main frame, a set of figure wheels mounted on said frame, a dummy having driving connection with said set of figure wheels, said dummy also having a driving member not engaging said set of figure wheels, an auxiliary frame, a second set of figure wheels mounted on said auxiliary frame, and means for transmitting the drive from said driving member to said second set of figure wheels, said second set of figure wheels being provided with mechanism for actuation of each wheel by the next adjacent wheel, said mechanism including carriers having extensions, and said auxiliary frame having a recess receiving said extensions.

8. A combined season and trip odometer comprising a main frame, a set of figure wheels mounted on said frame, a dummy having driving connection with said set of figure wheels and having a driving member not engaging said set of figure wheels, an auxiliary frame secured to said main frame, a second set of figure wheels mounted on said auxiliary frame, and means for transmitting the drive from said driving member to said second set of figure wheels.

In testimony whereof I affix my signature.

RALPH O. HELGEBY.